Oct. 3, 1961     R. D. BAGG     3,002,784
AUTOMOBILE HEAT SAVER PARTITION
Filed May 15, 1959

INVENTOR.
Robert D. Bagg
BY
L. S. Saulsbury
ATTORNEY

United States Patent Office 3,002,784
Patented Oct. 3, 1961

3,002,784
AUTOMOBILE HEAT SAVER PARTITION
Robert D. Bagg, 81 Maple St., Oneonta, N.Y.
Filed May 15, 1959, Ser. No. 813,474
2 Claims. (Cl. 296—85)

This invention relates to an automobile heat saver partition.

It is the principal object of this invention to provide a collapsible partition for automobiles adapted to be located in the automobile and attached to the rear of the front seat so as to keep the heat oft he automobile within the front seat space thereby eliminating the necessity of heating the rear seat space when vacant so that the driver will be supplied with adequate heat during cold weather with below zero temperatures.

It is another object of the invention to provide a partition for automobiles which has a transparent top piece so that the partition while located in the rear of the driver will not impair the visibility of the driver through the rear view mirror.

It is still another object of the invention to provide a heat saving partition for automobiles that is collapsible so that it can be stored easily in the trunk of the automobile when not in use or even left standing in a collapsed condition in rear of the front seat when not in use.

It is a further object of the invention to provide a heat saving partition for automobiles that can be attached to the rear of the front seat and supported therefrom by a simple strap.

It is a still further object of the invention to provide a heat saving partition for automobiles which will be made up in the form of a kit of few tube parts which can be readily assembled and fitted to one another and attached to the front seat of the automobile, and that is easy to disassemble and put into storage, the same consuming little space when disassembled.

Other objects of the invention are to provide a collapsible heat saver partition for automobiles, having the above objects in mind, which is of simple construction, inexpensive to manufacture, has a minimum number of parts, light in weight, easy to assemble, durable, of pleasing appearance, effective and efficient in use.

Figure 1:
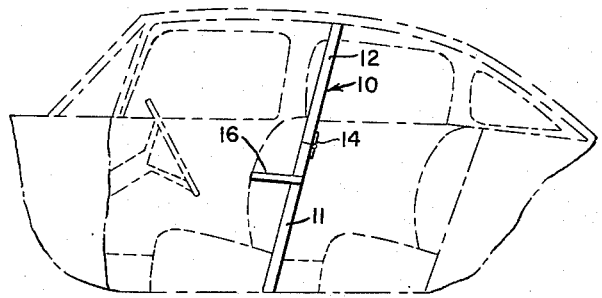
Figure 2:
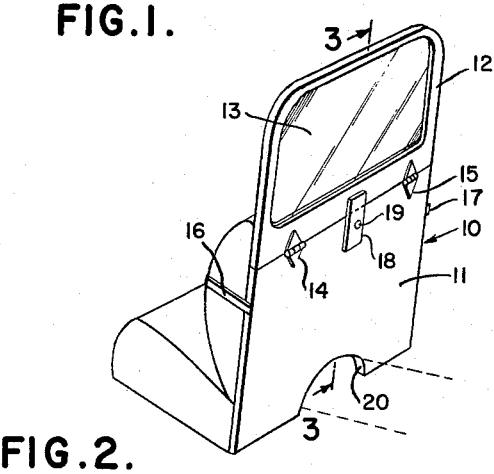
Figure 3:
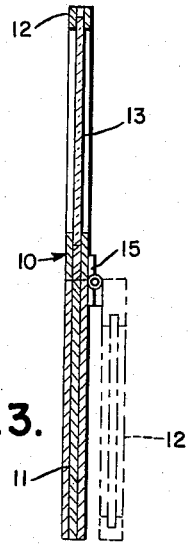
Figure 4:
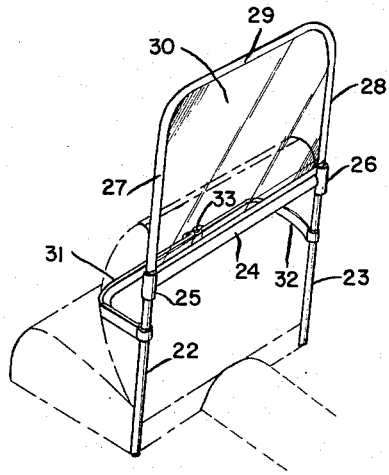
Figure 5:
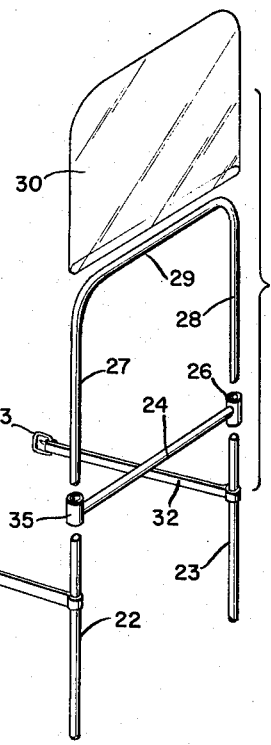

For other objects and a better understanding of the invention, reference may be had to the following detailed description taken in connection with the accompanying drawing, in which FIGURE 1 is a side elevational view of a heat saver partition installed in an automobile upon the rear of the front seat thereof and constructed according to one form of the invention, FIG. 2 is a perspective view of the partition and the seat to which it is attached by a strap, FIG. 3 is an enlarged vertical sectional view of the partition as viewed on line 3—3 of FIG. 2 with illustration made as to the manner in which the partition may be collapsed, FIG. 4 is a vertical perspective view of a heat saving partition formed of a plurality of tube parts according to another form of the invention, and FIG. 5 is an exploded view of the partition shown in FIG. 4 and illustrating the manner in which the parts are assembled to one another.

Referring now particularly to FIGS. 1 to 3, 10 generally represents the collapsible partition constructed according to one form of the invention comprising a bottom section 11 and a top frame 12 with a transparent window 13 therein and hingedly connected to the upper end of the lower section by hinges 14 and 15 so that the upper frame section 12 can be collapsed downwardly over the rear face of the lower section 11 at times when the rear seat space is to be heated as illustrated in FIG. 3 at 12' or when the partition is to be stored in the trunk space. Strap parts 16 and 17 are extended about the front seat to hold the partition against the rear face of the front seat. The window frame section 12 is held in its elevated position by a turn knob 18 secured to the lower section 11 on a pivot pin 19 near to the upper edge thereof and adapted when turned to overlie the lower edge to extend upwardly over the lower edge of the frame section 12 whereby the upper section will be held in its extended and raised position. The lower edge of the section 11 is cut away at 20 to accommodate the shaft hump in the floor of the automobile. The partition may be made of cardboard, plywood, plastic or metal.

Referring now particularly to FIGS. 4 and 5, the partition is made up of aluminum tube parts. Pipe leg supports 22 and 23 have fitted to their upper ends thereof a transverse member 24 by its sockets 25 and 26 to the upper ends of which there are fitted legs 27 and 28 of a U-shaped member having a top portion 29. An elongated transparent plastic sheet 30 shaped to conform to the U-shaped member is slid downwardly over the top portion 29 to provide a window partition through which the driver can see. Plastic sheet 30 is closed at the top and shaped to conform to the rounded ends of the top portion 29 of the U-shaped member. Separable straps 31 and 32 are respectively secured to the leg extensions 22 and 23 and can be fastened together by a buckle 33 about the front of the automobile seat in the manner illustrated in FIG. 4. In both forms of the invention the upper section or part of the partition is contoured to conform to the upper interior of the automobile.

It should now be apparent that there has been provided a heat saver partition for automobiles that can be collapsed or disassembled when not being used and which can be easily assembled, upon the rear of the front seat by simply connecting together straps about the front seat.

The legs and the transverse member constitute a lower section and the U-shape member with the transparent sleeve 30 constitute the upper section.

While various changes may be made in the detailed construction, it shall be understood that such changes shall be within the spirit and scope of the present invention as defined by the appended claims.

What is claimed is:

1. A heat saver partition for automobiles comprising a lower section composed of vertical pipes supported on a floor of the automobile and a transverse member having sockets fitted to the upper ends of the pipes, belt means for detachably securing the lower section to the rear of and about the front seat of the automobile, a transparent second section releasably connected to the lower section and adapted to be elevated or lowered therefrom to provide a closure for the upper portion of the interior of the automobile, said upper section conforming generally thereto, and said upper section comprising a U-shaped member having legs adapted to be tight fitted into the sockets of the transverse member, and the transparent member conforming to the shape of the U-shaped member and terminating at the transverse member.

2. A heat saver partition for automobiles comprising a lower section composed of vertical pipes supported on a floor of the automobile and a transverse member having sockets fitted to the upper ends of the pipes, a transparent second section releasably connected to the lower section and adapted to be elevated or lowered therefrom to provide a closure for the upper portion of the interior of the automobile, said upper section conforming generally thereto, and said upper section comprising a U-shaped member having legs adapted to be tight fitted into the sockets of the transverse member, and the transparent member conforming to the shape of the U-shaped member and terminating at the transverse member.

References Cited in the file of this patent

UNITED STATES PATENTS

| | | |
|---|---|---|
| 1,654,393 | Wedge | Dec. 27, 1927 |
| 2,442,821 | Menrath | June 8, 1948 |
| 2,530,266 | Quackenbush | Nov. 14, 1950 |
| 2,884,279 | Halstead et al. | Apr. 28, 1959 |